No. 877,491. PATENTED JAN. 28, 1908.
T. C. DILL.
VARIABLE SPEED MECHANISM.
APPLICATION FILED JAN. 28, 1907.
2 SHEETS—SHEET 1.
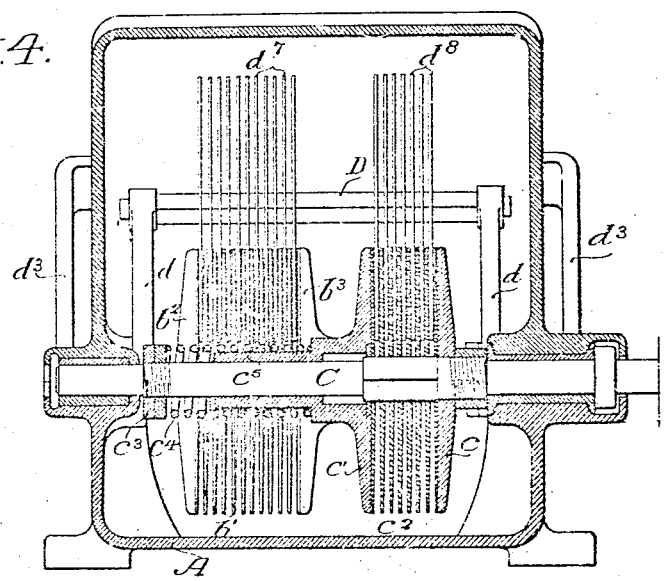
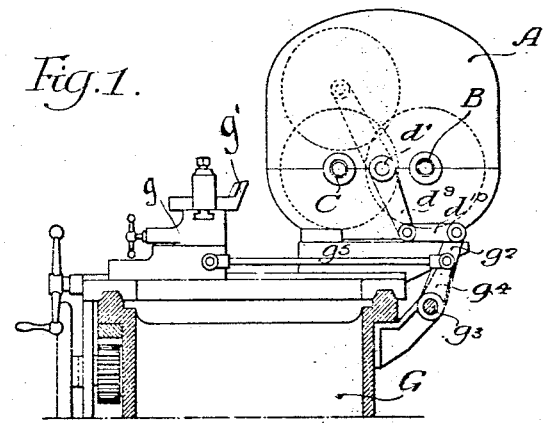
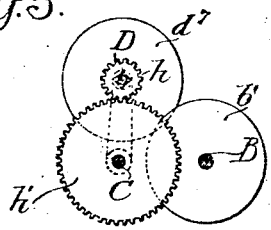
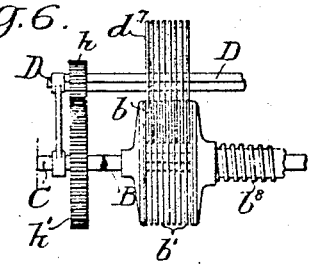
Witnesses:
Walter F. Pullinger
Titus H. Iones
Inventor
Thomas C. Dill
by his Attorneys
Howson & Howson No. 877,491. PATENTED JAN. 28, 1908.
T. C. DILL.
VARIABLE SPEED MECHANISM.
APPLICATION FILED JAN. 28, 1907.
2 SHEETS—SHEET 2.
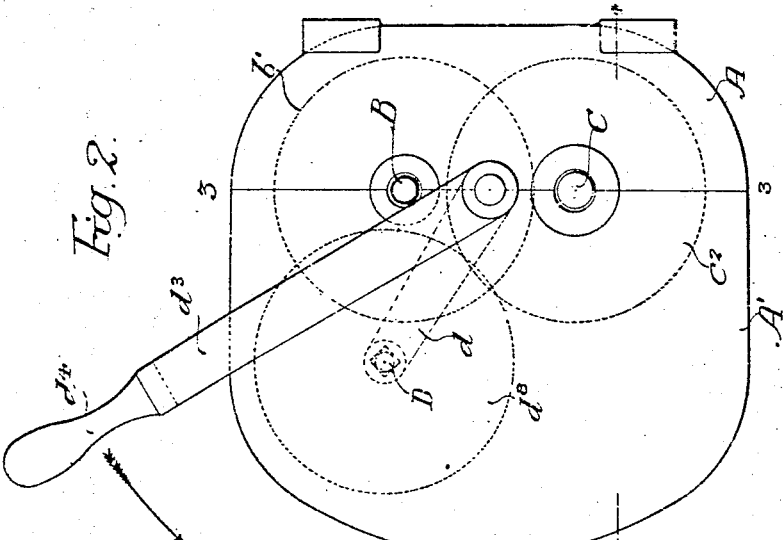
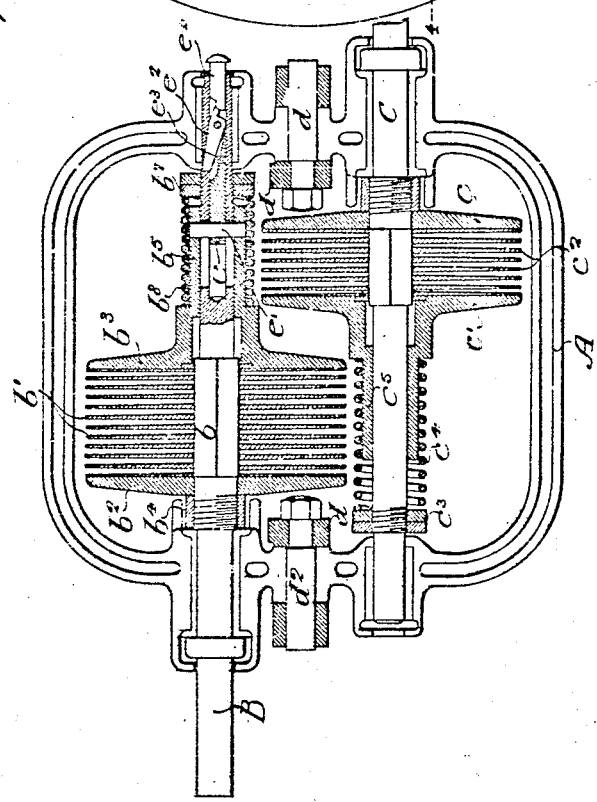
Witnesses:
Inventor
Thomas C. Dill.
by his Attorneys
Howson + Howson

UNITED STATES PATENT OFFICE.

THOMAS C. DILL, OF PHILADELPHIA, PENNSYLVANIA.

VARIABLE-SPEED MECHANISM.

No. 877,491.     Specification of Letters Patent.     Patented Jan. 28, 1908.

Application filed January 28, 1907. Serial No. 354,518.

*To all whom it may concern:*

Be it known that I, THOMAS C. DILL, a citizen of the United States, residing in Philadelphia, Pennsylvania, have invented certain Improvements in Variable-Speed Mechanism, of which the following is a specification.

One object of my invention is to provide an efficient, simple, and inexpensive device for transmitting relatively large amounts of power from a driving to a driven shaft; the construction being such that said device may be adjusted to vary the speed of the driven shaft between predetermined limits.

I further desire to provide a device of the character noted with means whereby, after said device has been adjusted to reduce the speed of the driven shaft to a minimum, said two shafts may be operatively disconnected and maintained in such condition until they have been released therefrom by the operator.

Another object of my invention is to provide variable speed mechanism particularly adapted for use on a lathe or other machine tool, either with or without means whereby it may be automatically actuated to vary the speed of the driving shaft of the lathe as a cutting tool is moved inwardly or outwardly.

These objects and other advantageous ends I secure as hereinafter set forth, reference being had to the accompanying drawings, in which:—

Figure 1, is a vertical section of a portion of a lathe, illustrating my invention as applied thereto; Fig. 2, is an end elevation of my improved speed changing mechanism, illustrating it as arranged to be operated by hand; Fig. 3, is a vertical section taken on the line 3—3, Fig. 2; Fig. 4, is a horizontal section taken on the line 4—4, Fig. 2, Fig. 5, is an end elevation illustrating a possible modification of my speed changing mechanism, and Fig. 6, is a side elevation of a special form of my invention.

In the above drawings, A and A' represents the two parts of a casing inclosing and serving to support the parts comprising my invention; there being in the same bearings for a driving shaft B and a driven shaft C. In addition, there is a third shaft D, preferably square in section, which is carried upon a pair of arms $d$ fixed respectively to short shafts or spindles $d'$ and $d^2$ journaled in opposite ends of the casing and projecting through the same. A yoke-shaped piece $d^3$ having a handle $d^4$, has its arms keyed or otherwise fixed to the spindles $d'$ and $d^2$ respectively so that as it is moved, said spindles cause the two arms $d$ with their shaft D to swing inside of the casing.

The shaft B has a squared portion $b$ upon which are mounted a number of metallic disks $b'$ decreasing in thickness outwardly from points adjacent to the shaft toward their peripheries. At the respective ends of this series of plates there are mounted on the shaft two relatively heavy plates $b^2$ and $b^3$, of which one abuts upon a collar $b^4$ fixed on the shaft B, and the other is extended to form an elongated collar $b^5$, upon which is carried a spiral spring $b^6$. The end of the shaft B adjacent to said spring is hollow and has within it a slidable rod $e$ connected by a pin $e'$ with the sleeve portion $b^5$ of the plate $b^3$; the shaft B being slotted, as shown, to permit the rod $e$ and its pin $e'$ to move longitudinally independently of it. The outer end of said rod is slotted for the reception of a pivotally mounted pawl $e^2$, which at one end is continually pressed outward by a spring $e^3$, while its opposite end is formed to be engaged by a longitudinally movable bolt $e^4$. The adjacent ends of said bolt and pawl are so formed that when the bolt is pushed inwardly it causes the pawl to turn on its pivot and thereby move its opposite end completely into the slot of the rod $e$ against the action of the spring $e^3$; it being held in such position until such time as the bolt $e^4$ is again moved outward. The shaft B is slotted adjacent to the end of the long arm of the pawl $e^2$ so that when the rod $e$ has been moved to its extreme right hand position, said pawl may enter this slot; the various parts occupying the relative positions shown in Fig. 3.

Screwed or otherwise fastened to the shaft B is a collar or collars $b^7$ and confined between this and the plate $b^3$ is a relatively strong spiral spring $b^8$ tending to force said plate and its disks $b'$ toward the plate $b^2$. The shaft C carries a fixed and a movable plate indicated respectively at $c$ and $c'$; being squared to receive a series of disks $c^2$ mounted between these plates, which disks are, like the disks $b'$, of decreasing thickness from their centers to their peripheries. The collar or collars $c^3$ serve as an abutment for a spring $c^4$, which in part rests upon a sleeve section $c^5$, in the present instance formed integral with the plate $c'$ so as to continually force said plate and the disks $c^2$ toward the plate $c$.

The bodily movable shaft D carries two sets of disks $d^7$ and $d^8$, preferably of uniform thickness from periphery to center, which though free to move longitudinally on the shaft, are compelled to turn therewith. The first of these sets of disks $d^7$ is intended to fit at all times between the disks $b'$, while the disks $d^8$ are similarly so placed as at all times to fit between the disks $c^2$; it being noted from Figs. 1 and 2 that the depth of engagement of the disks $d^7$ and $d^8$ with the other two series of disks may be varied, as desired, by means of the handle $d^4$.

Under operating conditions, with the disks in the positions indicated in Fig. 2, if power be applied to the shaft B, it will be seen that the shaft C is driven at a minimum speed, the reason for this being that the disks $b'$ are engaged by the disks $d^7$ at points relatively near the centers of the former disks, so that said disks $d^7$ are driven at a slow speed. As a consequence, the disks $d^8$ drive the disks $c^2$ at practically the same speed as the disks $d^7$, since they engage these disks on the shaft C at points relatively near their peripheries and the diameters of $c^2$ and $d^8$ are equal. If, now, the handle $d^4$ be moved in the direction of the arrow, it will be seen that the shaft C is speeded up for the reason that the disks $d^7$ engage portions of the disks $b'$ farther from the shaft B and therefore move it at a higher velocity. In addition, the point of engagement of the disks $d^8$ with the disks $c^2$ is moved toward the shaft C and for this reason also the speed of said shaft is increased. Such increases of speed continues as the handle with its arms is swung on the spindles $d'$ and $d^2$, while a reverse action takes place as said handle is moved back in a direction opposite to that indicated by the arrow.

It will be noted that the forcing of the flat disks $d^7$ between the disks $b'$ compresses the spring $b^8$ because of the increased separation of said latter disks and the sliding outwardly of the plate $b^3$. As a result of this action, when the handle $d^4$ has been moved to the position of minimum speed, the sleeve $b^5$ carries with it the pin $e'$ and the bolt $e$ to such position that the end of the pawl $e^2$ springs outward into the slot in shaft B, so that, if the handle $d^4$ be moved but a very short distance in the direction of the arrow, the flat plates $d^7$ are operatively released or disconnected from the disks $b'$. The plate $b^3$ is therefore maintained in its outermost position, and there is, consequently, no force tending to move the plates $b'$ into engagement with the plates $d^7$.

It will be understood by those skilled in the art that this device is particularly useful when employed on machine tools, for by it the speed may first be lowered from a maximum to a minimum, and the part driven finally brought to a complete stop while the various parts are moving at minimum speed.

In order to again place the device in operative condition it is only necessary to move the handle $d^4$ for a slight distance in a direction opposite to that of the arrow in Fig. 2, so as to some extent relieve the pressure on the pawl $e^2$, after which the pin $e^4$ may be forced inwardly, so as to free the rod $e$ and the plate $b^3$ from the shaft B and again permit the disks $b'$ to operatively engage the disks $d^7$.

In employing my invention in connection with a lathe, I may, if desired, provide it with an automatic attachment whereby, as the cutting tool approaches the axis of revolution of the work operated on, said work is speeded up in order that the tool may continue to cut at its full capacity. For this purpose I arrange the parts as shown in Fig. 1, in which G is the frame of a lathe having a tool carriage $g$ and a cutting tool $g'$. In any suitable position upon the lathe frame I support my improved speed changing mechanism, driving the shaft B from any desired source of power and so placing the shaft C so that it is in line with the line center of the lathe. To one of the spindles as $d'$, I attach an arm $d^9$ and connect this by a link $d^{10}$ to an arm $g^2$ fixed to the shaft $g^3$. Said shaft is provided with a second arm $g^4$ connected by a link $g^5$ to the tool carriage $g$ in such manner that as said carriage is fed toward the axis of revolution of the work operated on by the lathe, the arm $g^4$ causes the shaft $g^3$ to be turned, thereby also swinging the arm $g^2$ and automatically causing speeding up of the driven shaft C. As a consequence, the work is turned at a higher speed as the tool approaches the axis of revolution of said work and the tool may thereby be compelled to operate at its full capacity.

If desired, I may construct a special form of my invention as shown in Fig. 5, in which, in place of the second set of disks on the shaft D and the disks $c^2$ on the shaft C, I mount on said shaft D a pinion $h$ in such manner as to mesh with a gear $h'$ fixed to the shaft C. As a consequence, when the disks $d^7$ are moved toward the center of the shaft B into engagement with the disks $b'$, the speed of the shaft C is cut down, while, if the shaft D be swung on the shaft C as an axis away from the shaft B, the speed of said shaft C is increased. In any case, however, I employ on each of the two shafts B and D a series of disks, of which one series is thrust together by a spring, while the disks $d^7$ are so supported on the shaft D that they are compelled to turn therewith while being free to move longitudinally.

I claim:

1. Variable speed mechanism including two shafts, one shaft having supporting means whereby it is free to be adjusted toward and from the other shaft, a series of disks carried on each shaft so as to be compelled to turn therewith, the disks of one series each having their faces parallel and those of the other series each increasing in thickness from the periphery toward the center, the shafts being placed to permit of the disks of one series engaging those of the other, and fitted to the disks so as to at all times maintain them parallel to each other, and a spring tending to force together the disks of one of said series, substantially as described.

2. The combination of three shafts, means for supporting one of said shafts so that it is movable toward and from another of said shafts, said movable shaft and another of said shafts having each a series of disks placed to respectively engage each other, each series of disks being mounted on its supporting shaft so as to be compelled to turn therewith, means for yieldingly pressing together the disks of one series, and means independent of said two series of disks for transmitting power from the movable shaft to the third shaft, substantially as described.

3. The combination of three shafts, supporting means for said shafts including a device on which one of the shafts is mounted so as to be adjustable toward and from the other shafts, two of the shafts being each provided with a series of disks mounted so as to be compelled to turn with it, and the adjustable shaft having two series of disks mounted to transmit power from one series to the other, one series being capable of engaging the disks of one shaft, and the other being capable of engaging the disks of the other shaft, with means for yieldingly pressing together the respective series of disks on the two fixed shafts, substantially as described.

4. The combination of two shafts, each having a series of disks mounted so as to revolve with it but free to move longitudinally thereon, a third shaft, adjustable supporting means for said third shaft whereby it may be moved toward and from one of the shafts, two series of disks carried on the adjustable shaft so as to be driven one from the other but free to move toward and from each other, said adjustable shaft having its disks respectively engaged by the disks of the other two shafts, with means for yieldingly pressing together the disks of each series on said latter shafts, substantially as described.

5. The combination of three shafts, fixed bearings for two of the shafts, a series of tapering disks on each of said latter shafts, means for supporting the third shaft so that it is free to move toward and from the other shafts, two series of plane disks mounted on the third shaft, and arranged so that one series is driven by the other, one series of disks of the third shaft engaging the disks of one of the other shafts, and the second series of disks on said third shaft engaging the disks of the remaining shaft, and springs for pressing together the disks of the two fixed shafts, substantially as described.

6. The combination of two shafts, a plurality of disks on each shaft respectively engaging each other, a spring tending to press together the disks on one shaft, with automatically acting means for rendering the spring temporarily inactive, under predetermined conditions, substantially as described.

7. The combination of two shafts, a series of disks mounted on each shaft, said series of disks respectively engaging each other, with a spring tending to press together the disks of one series, means for varying the depth of engagement of the disks of the two series, and automatically acting means for rendering said spring temporarily inactive when the disks acted on by it are moved a predetermined distance apart, substantially as described.

8. The combination of two shafts, a series of disks mounted on each shaft, and respectively engaging each other, a spring tending to press together the disks of one series, means for varying the depth of engagement of the disks of the two series, and automatically acting means for holding said spring temporarily inactive when the disks of one series are engaged to a maximum depth by those of the other series, substantially as described.

9. The combination of two shafts, of which one is provided with fixed bearings and the other is mounted so as to be movable toward and from the first shaft, a series of disks on each shaft and revoluble therewith, the disks of each series engaging each other, means for yieldingly pressing together the disks of one of the series, means for moving the adjustable shaft toward and from the first shaft to vary the depth of engagement of the disks, and automatic means for rendering the pressing means temporarily inactive, when said adjustable shaft has been moved a predetermined distance toward the first shaft, substantially as described.

10. The combination of two shafts, of which one is provided with bearings and the other is mounted so as to be movable toward and from the other, a series of disks on each shaft and revoluble therewith, the disks of each series engaging each other, means for yieldingly pressing together the disks of one of the series, means for adjusting the movable shaft toward and from the first shaft to vary the depth of engagement of the disks, automatic means for rendering the pressing means temporarily inactive, and a hand operated releasing device for said means, substantially as described.

11. The combination of two shafts fixed relatively to each other, a third shaft mounted so as to be movable toward and from the of the shafts, with a series of disks on each of the fixed shafts so mounted as to be revoluble therewith, means for yieldingly pressing together the disks of each series, two series of disks mounted on the third shaft and operatively connected to transmit power one to the other, the disks of said series respectively engaging with the two series of disks on the fixed shafts, with a device for automatically rendering inactive one of the said yielding disk pressing means, substantially as described.

12. The combination of two shafts fixed relatively to each other, a third shaft mounted so as to be movable toward and from one of the shafts, with a series of disks on each of the fixed shafts so mounted as to be revoluble therewith, means for yieldingly pressing together the disks of each series, two series of disks mounted on the third shaft so as to be revoluble therewith, the disks of said series respectively engaging with the two series of disks on the fixed shafts, means for moving the adjustable shaft to vary the depth of engagement of its disks with the other series of disks, and a device for rendering inactive one of the springs when the disks of its shaft have been separated to a maximum extent, substantially as described.

13. The combination of two shafts, means for one shaft whereby its distance from the other shaft may be adjusted, two series of disks respectively carried on said shafts so as to be revoluble therewith, the disks of one series engaging those of the other series so as to alternate therewith, a spring for pressing together the disks of one of the series, an automatically acting pawl carried by the shaft having the spring and capable of rendering said spring inactive when its series of disks are separated to a maximum extent, and a bolt for releasing said pawl, substantially as described.

14. The combination of a casing, two shafts having bearings therein, a series of separable disks for each shaft yieldingly pressed together and compelled to revolve with their respective shafts, an arm or arms pivotally mounted on the casing, a third shaft carried thereby, two series of disks mounted on said third shaft connected to transmit power one to the other, and means for swinging said shaft supporting arm or arms on its supporting pivot to cause the disks of said shaft to engage the disks on the other shaft to varying depths, substantially as described.

15. The combination of a casing, two shafts having bearings therein, a series of separable disks for each shaft yieldingly pressed together and compelled to revolve with their respective shafts, an arm or arms pivotally mounted on the casing, a third shaft carried thereby, two series of disks mounted on said third shaft so as to revolve therewith, with automatically operating means for swinging said shaft supporting arm or arms on its supporting pivot to cause the disks on said shaft to engage the disks on the other shaft to varying depths, substantially as described.

In testimony whereof, I have signed my name to this specification, in the presence of two subscribing witnesses.

THOMAS C. DILL.

Witnesses:
WILLIAM E. BRADLEY,
WM. A. BARR.